United States Patent [19]

Bamba

[11] Patent Number: 4,580,151

[45] Date of Patent: Apr. 1, 1986

[54] OPTICAL SCANNING APPARATUS

[75] Inventor: Nobuo Bamba, San Jose, Calif.

[73] Assignee: Ricoh Company, Ltd., Tokyo, Japan

[21] Appl. No.: 637,387

[22] Filed: Oct. 22, 1984

[51] Int. Cl.$^4$ ............................................... G02B 5/32
[52] U.S. Cl. .................................. 346/160; 350/3.71;
350/3.72
[58] Field of Search .................. 346/107 R, 108, 160,
346/76 L, 160; 350/3.71, 3.72, 167, 1.1;
358/300, 302

[56] References Cited

U.S. PATENT DOCUMENTS

| | | | |
|---|---|---|---|
| 4,073,566 | 2/1978 | Noguchi | 350/3.71 |
| 4,348,080 | 9/1982 | Funato | 350/3.71 |
| 4,390,235 | 6/1983 | Minoura | 350/6.6 |

Primary Examiner—E. A. Goldberg
Assistant Examiner—A. Evans
Attorney, Agent, or Firm—Flehr, Hohbach, Test, Albritton & Herbert

[57] ABSTRACT

A hologram array is utilized having a plurality of adjacent holograms which are illuminated at an acute angle by laser diodes. Each laser diode output is modulated by an information source such as a computer output or the like. The outputs of the hologram array leave the hologram at an acute angle such that the focal points of the beams leaving the hologram array are focused on the object surface (a photoreceptor or the like). Closely controlled spacing of the outputs of the holograms is achieved by appropriate spacing of the holograms. In order to provide two-dimensional scanning, an appropriate combination of spherical and cylindrical lenses may be utilized together with a moving polygonal mirror to move the output beams from the hologram across the surface of the photoreceptor.

14 Claims, 7 Drawing Figures

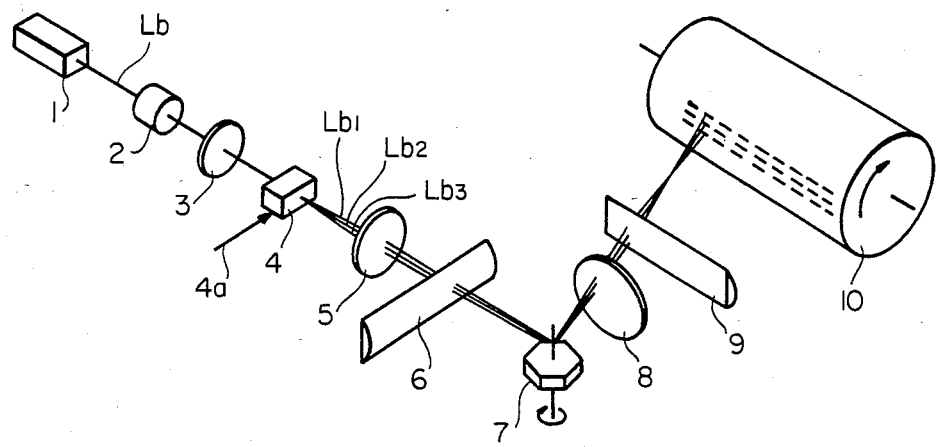
FIG_1
(PRIOR ART)
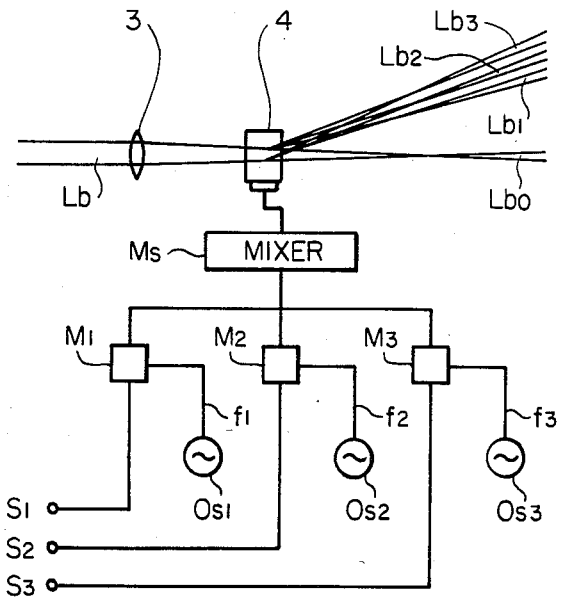
FIG_2
(PRIOR ART)

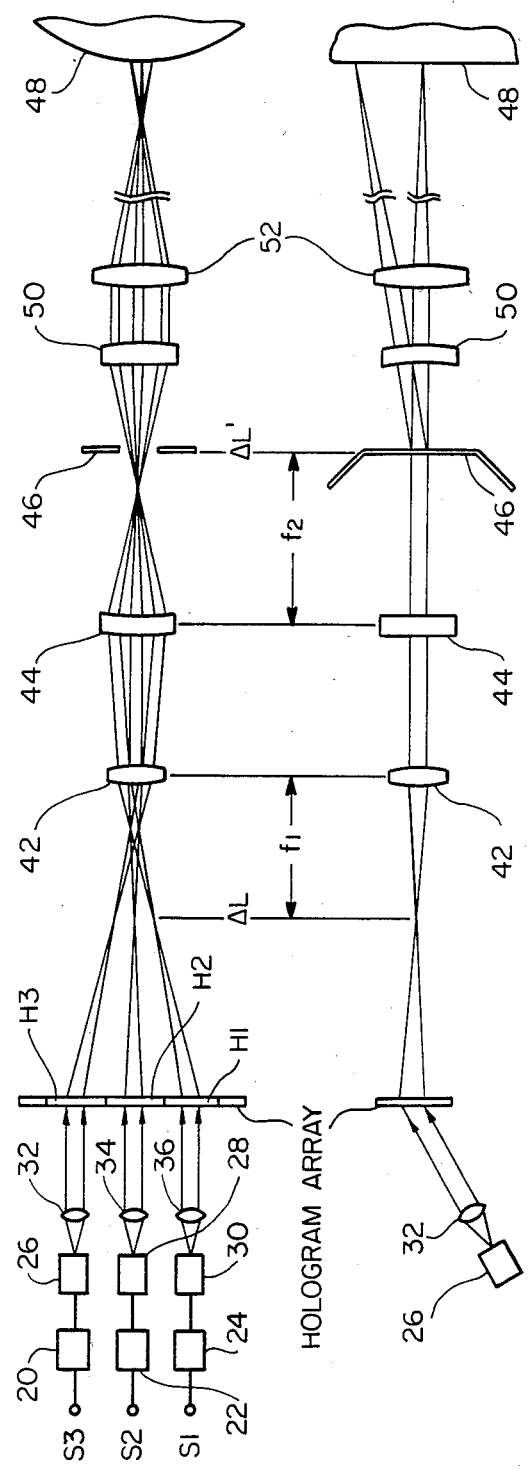
FIG_3

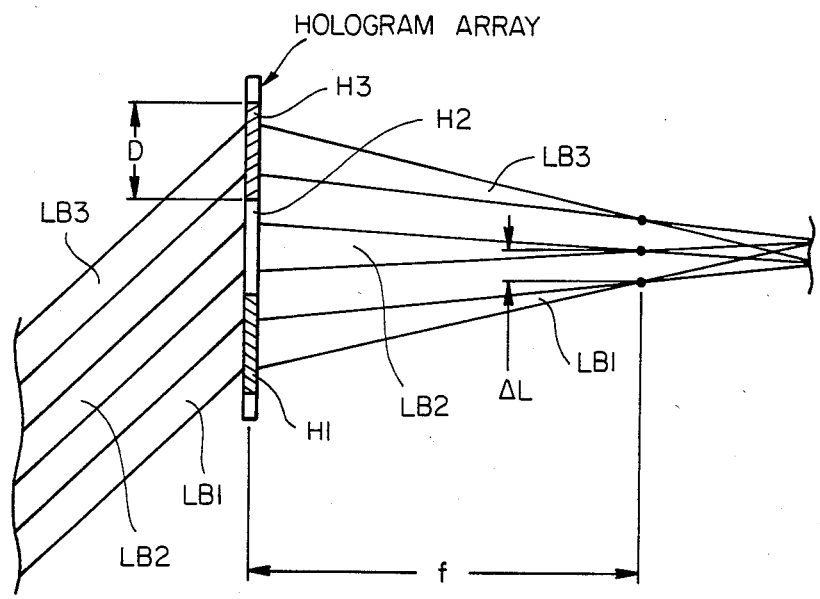
FIG_4
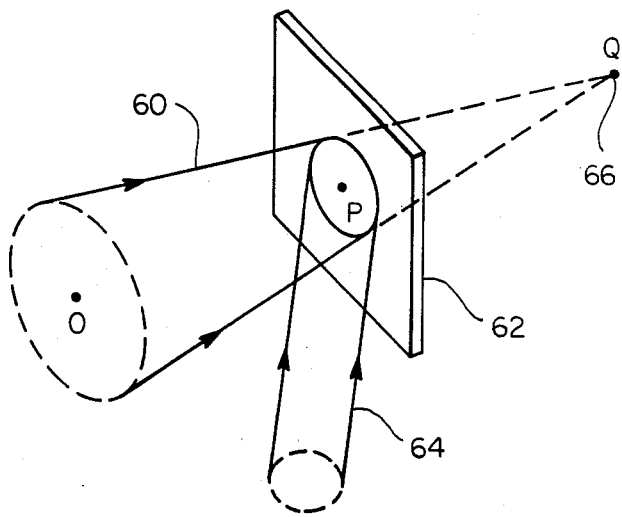
FIG_5

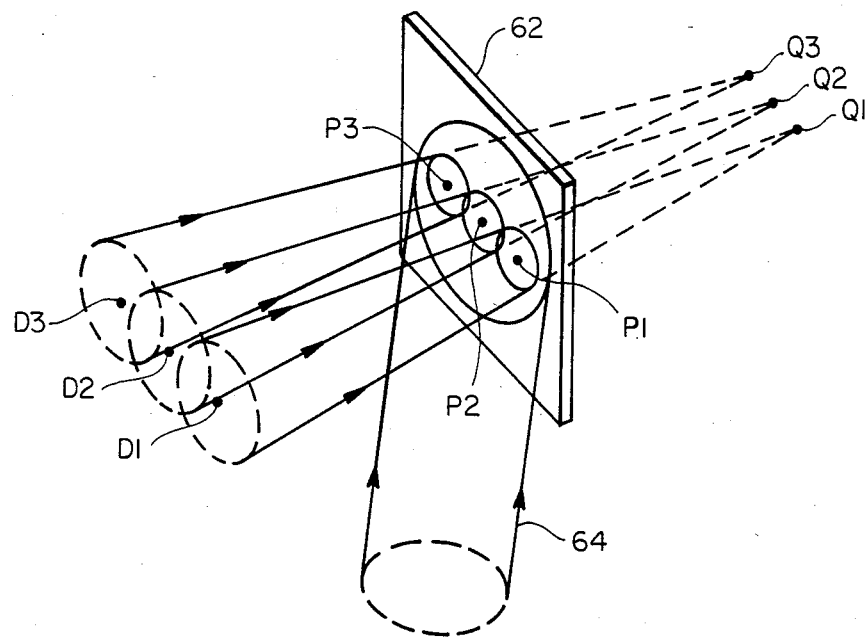
FIG_6
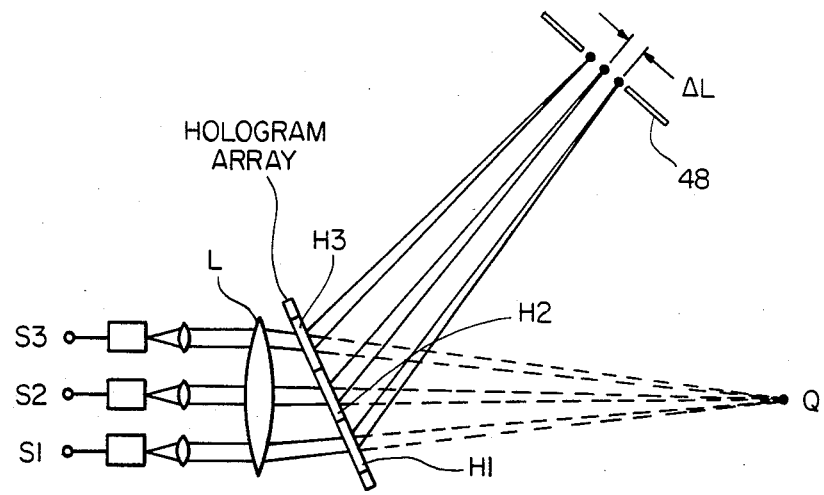
FIG_7

OPTICAL SCANNING APPARATUS

BACKGROUND OF THE INVENTION

The present invention relates to a scanning apparatus for use in exposing the photoconductive drum in an electrophotographic copying machine, and more particularly to optical scanning apparatus and method utilizing holographic techniques.

The present invention is especially suitable for use in a typical electrophotographic copying apparatus which is presently used in industry. This typical apparatus includes a rotatable drum having a photosensitive outer circumferential surface, and means for rotating the drum in a controlled fashion so that its outer surface defines a fixed annular path of movement. The apparatus produces copies by first forming an electrostatic image corresponding to the particular information to be copied on the photosensitive outer circumferential surface of the drum. Thereafter, the latent image is developed by means of toner particles, specifically electrically charged heat fusible particles, which are applied to the image bearing surface in a specific way. Finally, the applied toner particles are transferred from the drum to the blank sheet and thereafter fused thereon for transforming the sheet into a permanent copy. After the toner transfer is complete the drum is cleaned so that no trace of the electrical image either as represented by toner particles or static electric charge remains.

It is an objective of the present invention to provide an improved means for exposing the photosensitive outer surface of the drum to the information to be copied.

It is a further objective of the present invention to provide a means for conveying the high speed output of a computer or the like to the photosensitive surface of the recording drum.

Multibeam optical scanning systems capable scanning plural lines at a time have previously been proposed as a high speed output device for a computer or the like.

One example of such a multibeam optical scanning system is shown in U.S. Pat. No. 4,348,080. In this system illustrated by FIG. 1 herein a conventional laser recording apparatus is shown including a laser light source 1; a beam expander 2; a convergent lens 3; and an acoustooptic device 4 which modulates the laser light source by the incoming information from a computer or the like on line 4A. The multifrequency output passes through magnification adjustment lens 5, cylindrical lens 6, and is then rotated across the surface of the drum by rotating polyhedral mirror 7 through lens 8 and cylindrical lens 9. Similar acoustooptic devices are shown in U.S. Pat. Nos. 4,312,588; 4,390,235; and 4,344,677. All such devices however are quite expensive since they must have a very wide band width.

U.S. Pat. No. 4,348,080, as illustrated in FIG. 2 herein referred to above, is an effort to improve on these prior art device by the use of a rotating disc 14 carrying a plurality of holograms. This rotating disc is used in place of the rotary polyhedral mirror 7 of the prior art. However, the acoustooptic device drive insert which is shown in FIG. 2 of that patent remains complex and costly.

SUMMARY OF THE INVENTION

It is therefore an object of the present invention to provide a relatively inexpensive optical scanning apparatus which can substitute for the conventional optical scanning apparatus.

It is a more specific object of the present invention to provide a optical scanning apparatus which does not use the expensive acoustooptic device of the prior art.

Briefly, in the present invention, a hologram array is utilized which includes a plurality of adjacent holograms which are illuminated at an acute angle by laser diodes. Each laser diode output is modulated by an information source such as a computer output or the like. The outputs of the hologram array leave the hologram at acute angle such that the focal points of the beams leaving the hologram array are focused on the object surface (a photo receptor or the like). Closely controlled spacing of the outputs of the holograms is achieved by appropriate spacing of the holograms. In order to provide two dimensional scanning, an appropriate combination of spherical and cylindrical lenses may be utilized together with a moving polygonal mirror to move the output beams from the hologram across the surface of the photoreceptor.

A fairly extensive theoretical description of the use of holograms in optical scanning apparatus can be found in the U.S. Pat. No. 4,348,080 issued in Sept. 7, 1982 and assigned to a common assignee of this invention. This patent is incorporated herein by reference, as is an article on holographic linear gratings found in the Journal of the Optical Society of America, volume 73, No. 9 pages 11131118.

Further objectives and advantages of the present invention will become apparent to a person of skill in the art who reviews the subject invention disclosure in conjunction with the following figures:

BRIEF DESCRIPTION OF THE DRAWINGS

FIG. 1 is a block diagram of a prior art optical scanning system;

FIG. 2 is another disclosure of a prior art system which is an improvement over the system of FIG. 1;

FIG. 3 shows an optical scanning system incorporating the present invention for exposed the surface of a photoconductive drum in accordance with the present invention;

FIG. 4 shows the relationship between the hologram array utilized in this invention and the plural collimated beams which carry the information to the surface of the photoconductive drum;

FIG. 5 is a figure showing how a hologram is formed;

FIG. 6 is a figure showing how a hologram array which is especially useful in the present invention is formed; and, FIG. 7 is a side view of an alternative embodiment of the present invention for forming plural converged spots by using a holographic linear grating array.

DESCRIPTION OF THE PREFERRED EMBODIMENTS

FIG. 3 illustrates an embodiment of the invention in which the optical scanning apparatus is incorporated in the exposure system of an electrophotographic copying machine to serve as the output of a computer or the like.

Specifically, three separate data sources S1, S2, S3 are coupled to laser diode drivers 20, 22, 24. These drive laser diodes 26, 28 and 30. Through coupling lenses 32, 34, 36 the output of these laser diodes, as modulated by the information output of the computer or the like, is focused onto a hologram array which shall be discussed further in conjunction with FIGS. 4–6. The output of the hologram array is focused through the spherical lens 42 and cylindrical lens 44 onto a deflector 46. This deflector, which may be for example a rotating polygonal mirror, scans the focused convergent beams across the surface of the photoconductive drum 48 after the information is passed through appropriate toroidal lens 50 and focusing lens 52.

It is apparent from a study of FIG. 3, which encompasses both a side view and a top view, that the incoming collimated beams of light through the lens or lenses must be at an angle to the hologram array. Each hologram of the hologram array is prepared in accordance with the disclosure in FIGS. 4–6.

In FIG. 5 a reference beam 60 is shown focused on the plate of photosensitive material 62. An object beam 64 from a point source of light, and reference beam 60 which converges at a point Q66 are projected onto photosensitive material 62. The hologram is recorded on the photosensitive material 62 by the interference fringes of the two beams 60 and 64. In other words, a form of out of access Fresnel zone plate is recorded on the photosensitive porion 62. By moving the aperture which is used to record the hologram a distance ΔL, a series of holograms can be arrayed on a single photosensitive plate 62 as shown in FIG. 6.

Thus, a hologram H1 (FIG. 6) is recorded by the objective beam 64 and reference beam 60 with an optical axis 01- P1-Q1. The optical access is then moved to 02-P2-Q2, and the aperture is moved and the hologram H2 is recorded. The distance moved is the distance ΔL. Then a third hologram H3 is recorded.

FIG. 4 shows the relationship between the hologram array and the plural collimated beam which can be used to illuminate these holograms. These beams are equivalent to the beams which are the output of the coupling lenses 32, 34, 36, in the scanning system of FIG. 3. By use of these holograms, the laser diode collimated beams, appropriately modulated by the information to be recorded, are reconstructed, focused at the focal points of the original reference beam which was used to construct the hologram. Thus, by forming a plurality of adjacent holograms, and illuminating them simultaneously by a plurality of collimated beams, plural outputs points can be defined, all having the exact same focal length.

By having the collimated beams approach the hologram array 62 at an angle, the output beams converge at a known spacing which is equal to the spacing between the optical axes of the optical beams which were used to formulate the holograms.

An alternative embodiment is shown in FIG. 7. FIG. 7 comprises an embodiment having plural output at the desired spacing ΔL using a holographic linear grating array, the holograms being created in accordance with and theory disclosed in the above incorporated Optical Society article. The laser diodes outputs are passed through a focusing or coupling lens to the holographic array grating 68. (Each holographic linear grating has a different spatial frequency). The beams are deflected from the normal converging point and focused on a surface R at a spacing ΔL decided by incident angle to holographic linear grating, beam spacing between adjacent beams and spatial frequency. The angles made by the converging beams after passing through the grating obey the Bragg condition.

In summary, by appropriate spacing of the holograms in the array and by applying the collimated beams from the laser diode to the array in a manner to satisfy the known reconstruction conditions, plural reconstructed convergent light points can be obtained and scanned across the surface 48 of the photoconductive drum by means of spherical lens 42, cylindrical lens 44, deflector 46, toroidal lens 50 and focusing lens 52 not shown in FIG. 7; by rotation of the drum, successive lines of information can be written at relatively high speed on the drum surface providing a high speed output from a computer or the like.

While a specific embodiment of the invention has been shown and described in detail to illustrate the application of principle's invention, it will be understood that the invention may be embodied otherwise without departing from such principles. Therefore the scope of the present invention is to be limited only by the following claims.

What is claimed:

1. A scanning apparatus for scanning a surface with a plural number of independently modulated beam spots at the same time, comprising a light source for providing a plurality of independently parallel, collimated beams of light, means for independently modulating each of said beams of light and, a hologram array inserted in the path of said beams of light at an angle to said beams, whereby said modulated beams independently converge at spaced points at a known distance from said holographic grating.

2. Apparatus as claimed in claim 1 wherein said light source comprises an array of laser diodes spaced apart at distances to fix said points of convergence.

3. Apparatus as claimed in claim 1 wherein said hologram comprises an array of adjacent holograms having the same focal length.

4. Apparatus as claimed in claim 3 wherein said holograms are partially overlapping.

5. Apparatus as claimed in claim 4 wherein said distance between the centers of adjacent holograms defines the distance between adjacent lines defined by the points of convergence.

6. In an electrophotographic copying apparatus including a photoresponsive drum, means for exposing the surface of said drum with a plural number of independently modulated beam spots at the same time, comprising a light source for providing a plurality of independent parallel, collimated beams of light, means for independently modulating each of said beams of light, and a hologram array inserted in the path of said beams of light at an angle to said beams, whereby said modulated beams independently converge at spaced points at a known distance from said hologram array.

7. Apparatus as claimed in claim 6 wherein said light source comprises an array of laser diodes spaced apart at distances to fix said points of convergence.

8. Apparatus as claimed in claim 6 wherein said hologram array comprises an array of adjacent holograms having the same focal length.

9. Apparatus as claimed in claim 8 further including deflecting means for scanning said converged points of information across the surface of said drum.

10. Apparatus as claimed in claim 9 wherein said deflection means comprise a rotating polygonal mirror.

11. Apparatus as claimed in claim 8 wherein said holograms are partially overlapping.

12. Apparatus as claimed in claim 11 wherein the distance between the centers of adjacent holograms defines the distance between adjacent lines defined by the points of convergence.

13. In an electrophotographic copying apparatus including a photoresponsive drum, a method for exposing the surface of said drum with a plural number of independently modulated beam spots at the same time, comprising a light source for providing a plurality of independent, parallel collimated beams of light, independently modulating said plurality of independent, collimated beams of light, with distinct data sources, converting each of said light beams at spaced common focal points having a common focal length and a passing said beams of light through a holographic linear grating array inserted in the path of said beams of light, whereby said modulated beams independently converge at spaced points on said drum.

14. A method as claimed in claim 13 further comprising scanning said converging modulated beams information across the surface of said drum.

* * * * *

UNITED STATES PATENT AND TRADEMARK OFFICE
CERTIFICATE OF CORRECTION

PATENT NO. : 4,580,151
DATED : April 1, 1986
INVENTOR(S) : Nobuo Bamba

It is certified that error appears in the above—identified patent and that said Letters Patent is hereby corrected as shown below:

The Assignee should read as follows:

[73] Assignee: Ricoh Company, Ltd., Tokyo, Japan, and
Ricoh Systems, Inc., San Jose, California Signed and Sealed this Second Day of December, 1986

*Attest:*

DONALD J. QUIGG

*Attesting Officer*  *Commissioner of Patents and Trademarks*